R. GIBBONS.

Pocket for Wearing Apparel.

No. 9,612. Reissued March 22, 1881.

Witnesses;

Jacob Felbel.

H. Janvier

Inventor,

Rodmond Gibbons

By J. N. McIntire

Atty.

N. PETERS, PHOTO-LITHOGRAPHER, WASHINGTON, D. C.

UNITED STATES PATENT OFFICE.

RODMOND GIBBONS, OF NEW YORK, N. Y.

POCKET FOR WEARING-APPAREL.

SPECIFICATION forming part of Reissued Letters Patent No. 9,612, dated March 22, 1881.

Original No. 178,428, dated June 6, 1876. Application for reissue filed December 6, 1880.

*To all whom it may concern:*

Be it known that I, RODMOND GIBBONS, of New York city, in the State of New York, have invented a new and useful Improvement in the Pockets of Wearing-Apparel, of which the following is a specification, reference being had to the accompanying drawings, forming a part thereof.

The main objects of this invention are to avoid the transverse strain upon the stitching which should support a pocket; to dispense with cross-tacks, corner-patches, gussets, and metallic fasteners as pocket-supporters, and to secure strength and durability in pockets by a neat, simple, and cheap method of construction; and to this main end and object my invention consists in certain novel features in the structure of the pocket, and in a novel mode or process of forming the pocket, which will be all hereinafter more fully explained, and more specifically pointed out in the claims of this specification.

The said improvements are applicable to and in the pockets of all articles of suitable wearing-apparel, and admit, without change in the nature of my invention, of various shapes and fashionings of pocket-openings.

To enable those skilled in the art of manufacturing wearing-apparel to utilize the invention, I describe the same as follows, referring to the annexed drawings.

Figures 1 to 7, inclusive, represent various forms of said improvement and the modes of constructing the same.

Figure 1:
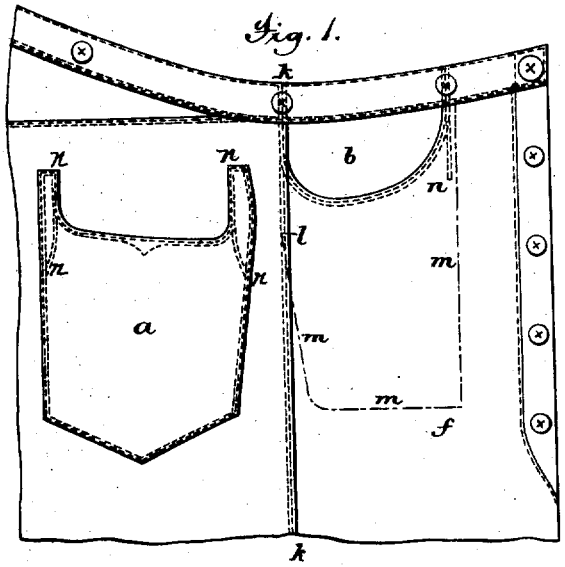

In Fig. 1, *a* represents an outside pocket particularly adaptable to overalls, the dots in said figure indicating stitching.

Figure 2:
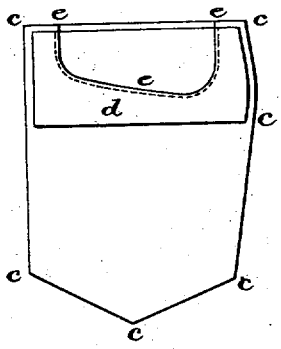

In Fig. 2 the manner of forming the outside or hip pocket is shown. The outside shape of the piece forming said pocket is seen at *c c c c c c*. By *d* is represented a smaller piece, laid face to face upon the other, the form of the pocket-opening having been marked upon it as per dotted line. The two pieces are then stitched as per said dotted line, and both thicknesses of stuff cut as per solid line *e e e*, say a quarter of an inch from the seam. The piece *d* is then turned over and inward close upon said seam, forming the rim of the pocket-opening, which is then stitched, as shown in Fig. 1. The outer edges, *c c c c c c*, are then turned under, and the pocket is sewed upon the garment, as also shown in Fig. 1 by *a*.

Figure 3:
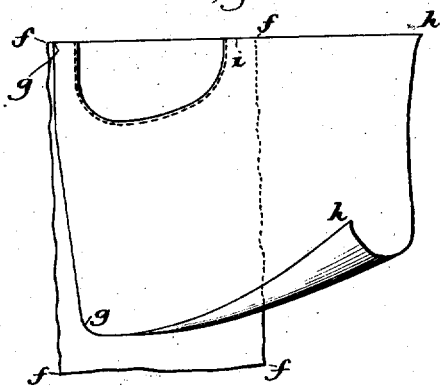
Figure 4:
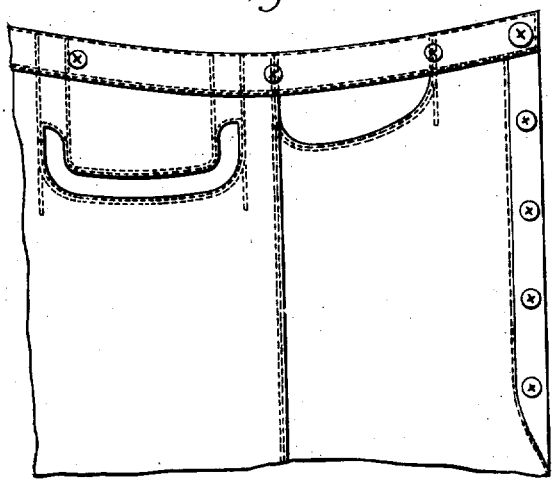

Fig. 3 shows the detail of front pocket, *b*, in Fig. 1. By *f f f f* is represented a section of the right side front, *f*, of the overall pattern, as shown in Fig. 1. A piece of cloth, *g g h h*, is laid face to face upon said section, as in Fig. 2, except that the top edges of the two pieces should be even, the pattern of the pocket (indicated by the dotted lines) having been previously marked upon it, as in the other case. The sewing is then done as per said dotted line, the stuff cut out as before, the piece turned over and inward close upon the seam, and the rim stitched, as shown in Fig. 1. The piece *g g h h* is then folded at *i*, so that the edge *h h* shall be made to coincide with the edge *g g*, the fold thus forming the back face of pocket *b*, as shown in Fig. 1.

There are two or more thicknesses of material brought together at *g g*, and in constructing the garment they are caught in the side seam, *k k*, as far down as *l*, from about which point the pocket is allowed to hang, as shown by the broken and dotted line marked *m*.

The dotted lines at *n*, Fig. 1, represent a line (or lines) of stitching passing through the pocket-piece and garment, as shown, and serving, when used, to further strengthen the structure at the vicinity of the end of the pocket opening.

Figure 5:
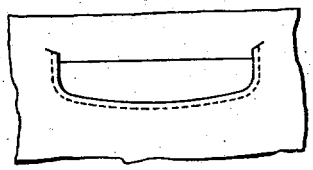
Figure 6:
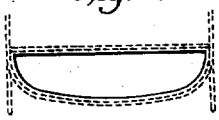

Figs. 4, 5, 6, and 7 are modifications in the shape of the pockets and pocket-openings, the construction being substantially the same as that hereinbefore described. Figs. 5 and 6 show side pockets suited to coats, &c., the solid lines in Fig. 5 showing the cut in the cloth and the dotted lines the pattern of the pocket-opening and the first seam in the facing, as in the other cases. Fig. 6 shows the stitching of the finished pocket-opening, (shown incomplete in Fig. 5,) which may be made with or without lappet.

Figure 7:
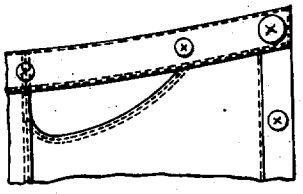

The greatest strain and wear and tear upon a pocket-opening are upon that side thereof upon which the hand bears the hardest when entering the pocket. Therefore, the purposes of this invention may be partially fulfilled by curving that side alone of the pocket-opening, as shown in Fig. 7; but I prefer to curve both sides, as hereinbefore described.

The waistband, as seen in Fig. 1, overlaps, and the buttons are incidentally made additional supports to the pockets.

It will be observed that in the structure of pocket and by the method of making shown and described I am enabled to provide garments in a cheap and economic manner with pockets of various patterns which will be much more durable and stronger at the localities where pocket-openings usually give away than pockets made according to any previously-known method of manufacture and principle of construction.

I am aware that the so-called crescent-shaped pocket in common use is often made to curve upward at the sides of the opening; but such pocket-openings are invariably made dependent for support on cross-tacks, patches, or gussets; and there is always a transverse strain upon the stitching that supports said pocket, all of which appliances are obviated by this invention.

Having described my invention, what I claim as new, and wish to secure by Letters Patent of the United States, is—

1. The herein-described method of making garment-pockets, consisting, essentially, in laying on the outside of the garment a piece, D, having an opening therein coinciding with the pocket-opening of the garment and arranged to register therewith, stitching the two together around the edge of the pocket-opening, and then turning the piece D through said pocket-opening (to the inside of the garment) and stitching down with one or more rows of stitching, as set forth.

2. A patch-pocket composed of the garment and a pocket-piece, *a*, having the ends of its rim or cut-out curved upwardly and stitched to the garment in substantially the manner described, for the purpose set forth.

3. A patch-pocket composed of the garment and a pocket-piece stitched together at the perimeter or contour of the patch, and having the supplemental stitching or seams *n n*, substantially as and for the purpose set forth.

4. A wearing-apparel pocket composed of a mouth or hand-opening in the garment and a pouch-like device or receptacle having a cut-out, the said mouth or opening of the garment being stitched for either all or for a portion only of its contour to a corresponding portion of the similarly-shaped cut-out in the said pouch-like device or receptacle, substantially as and for the purposes set forth.

5. A wearing-apparel pocket composed of a mouth or hand-opening in the garment and a pouch-like device or receptacle having a cut-out, the said mouth or opening of the garment being stitched for either all or for only a portion of its contour to a corresponding portion of the similarly-shaped cut-out in the said pouch-like device or receptacle, and the garment and pouch-like device having the supplemental vertical stitching at one or both of the upwardly-curved lower edges of the said cut-out and hand-opening, all substantially as and for the purposes set forth.

6. In a wearing-apparel pocket, the combination, with a pouch-like device or receptacle which has a portion of the material composing it removed to form its mouth or opening, of a hand-opening in the garment formed by the removal from the latter of a correspondingly-shaped piece of the material of which it is composed, as and for the purposes set forth.

7. A wearing-apparel pocket in which the lower edge or rim of the pocket-opening curves upwardly at either one or both ends of said opening, and in which the said lower edge or rim is composed of the united edges of portions of the pocket-piece cut-out and the garment hand-opening, by which construction the usual pull of the pocket-rim on the garment which supports it is in a direction substantially in line with the direction of the stitches which unite the said rim with the garment at the end or ends of the latter, as set forth.

In testimony whereof I have hereunto set my hand this 1st day of December, 1880.

RODMOND GIBBONS.

In presence of—

JACOB FELBEL,

J. N. MCINTIRE.